(12) United States Patent
Maiya Belur et al.

(10) Patent No.: US 11,010,196 B2
(45) Date of Patent: May 18, 2021

(54) CAPACITY ANALYSIS USING CLOSED-SYSTEM MODULES

(71) Applicant: VMware, Inc., Palo Alto, CA (US)

(72) Inventors: Gurudutt Maiya Belur, Union City, CA (US); Samuel P. McBride, San Jose, CA (US); Rachil Chandran, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1332 days.

(21) Appl. No.: 14/840,244

(22) Filed: Aug. 31, 2015

(65) Prior Publication Data

US 2017/0061321 A1 Mar. 2, 2017

(51) Int. Cl.
*G06N 20/00* (2019.01)
*G06F 9/50* (2006.01)
*G06Q 10/06* (2012.01)

(52) U.S. Cl.
CPC ............... *G06F 9/50* (2013.01); *G06N 20/00* (2019.01); *G06Q 10/06315* (2013.01)

(58) Field of Classification Search
CPC ........ G06N 20/00; G06N 5/025; G06N 7/005; G06K 9/6256; G06K 9/6269
USPC .......................................................... 706/12
See application file for complete search history.

(56) References Cited

U.S. PATENT DOCUMENTS

| | | | |
|---|---|---|---|
| 7,788,127 B1 | 8/2010 | Gilgur et al. | |
| 2003/0225563 A1* | 12/2003 | Gonos | G06Q 10/06 703/22 |
| 2006/0235664 A1 | 10/2006 | Vinberg et al. | |
| 2007/0174346 A1* | 7/2007 | Brown | G06F 16/20 |
| 2007/0271570 A1* | 11/2007 | Brown | G06F 9/5033 718/105 |
| 2008/0271038 A1* | 10/2008 | Rolia | G06F 9/505 718/105 |
| 2011/0307290 A1 | 12/2011 | Rolia et al. | |
| 2011/0307291 A1 | 12/2011 | Rolia et al. | |
| 2012/0053925 A1* | 3/2012 | Geffin | H05K 7/1498 703/21 |
| 2014/0012603 A1 | 1/2014 | Scanlon et al. | |
| 2016/0092767 A1* | 3/2016 | Osogami | G06N 3/08 706/25 |

OTHER PUBLICATIONS

Mosaic Technology Corporation, "VMware Basics Capacity Planning and Performance Monitoring", Mosaic's IT Director Series, downloaded on Jun. 23, 2015, pp. 1-20, Salem NH.

* cited by examiner

*Primary Examiner* — Viker A Lamardo
(74) *Attorney, Agent, or Firm* — Thomas Horstemeyer, LLP

(57) ABSTRACT

A capacity-analysis tool (CAT) provides a model framework for creating a model of a capacity-planning-target (CPT) system, e.g., a data center. The tool includes a model framework that, in turn, includes a closed-system template for creating CSMs, i.e., models of capacity-limited systems. A user uses the CAT to create CPT models using the CSMs as building blocks. A machine-learning engine is used to train the CPT model, converting parameter time-series data to functions of time. The trained CPT models are then used to make capacity-planning estimates, e.g., time remaining on a system before usage matches capacity. The CAT makes it easy to extend a model, e.g., by adding new dimensions (new factors of interest) in the form of new CSMs to which the new dimensions have been assigned.

20 Claims, 6 Drawing Sheets

CAPACITY ANALYSIS USING CLOSED-SYSTEM MODULES

BACKGROUND

"Capacity planning" involves scheduling the acquisition and management of resources to meet estimated future demands on a target system. For example, a data-center operator may need to estimate the space, computer hardware, software, network and other resources that will be needed over some future period of time. A typical capacity concern of many enterprises is whether resources will be in place to handle increased demand, e.g., as the number of users or interactions increase. Capacity may be added in time to meet the anticipated demand but not so early that resources go unused for a long period.

Although capacity planning finds particular applicability to data centers, that is, computer systems including large numbers of physical computers running a variety of workloads, capacity planning is generally applicable to a wide range of endeavors including, but not limited to, airline operations, traffic management, and facilities acquisition.

"Capacity analysis" involves characterizing a capacity-planning target (CPT) system as a basis for making capacity-planning decisions. A capacity-analysis tool (CAT) identifies to a user, typically a system administrator for the CPT system, the information needed for capacity analysis. The user provides the information, e.g., processing capacity of a server, or ensures that the requested information, e.g., time-varying usage data, is provided to the CAT. Based on this information, the CAT can estimate, for example, the efficiency with which resources are used or the degree to which resources are wasted, an amount of unused resource capacity, and how much time remains before (e.g., rising) demand reaches capacity. These estimates are then available to guide planning the management and inventory of resources for a CPT system.

DETAILED DESCRIPTION

Figure 1:
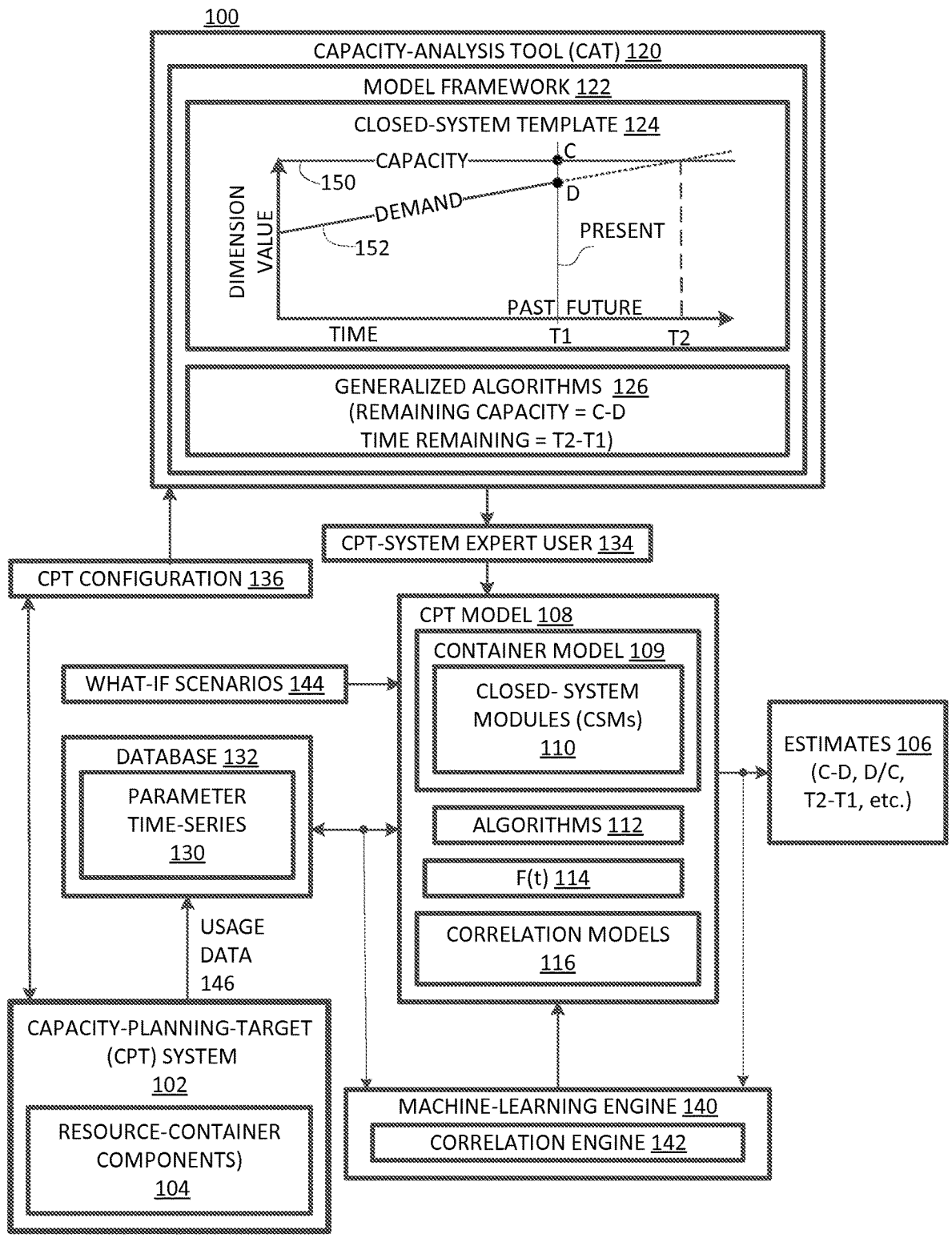
FIG. 1 is a schematic diagram of a capacity analysis system.

In the course of the present invention, it was recognized that CAT tools can sometimes neglect factors relevant to a capacity analysis. Even if a CAT addresses an adequate set of factors when first used, it might fail to address a factor that becomes impactful over time. For example, suppose a CAT allows a user to create a CPT model that adequately characterizes a CPT system, but that, later, the electric power supplier for the CPT system is forced to ration electric power. If the CAT does not provide for modifying the model to treat electric power as a factor bearing on capacity analyses, the model's usefulness for capacity analysis will be impaired.

For another example, suppose a data-center operator enters a service-level agreement that limits disk-access latencies to 10 milliseconds. If a CPT model does not work with latency as a dimension, then the CPT model's estimates may not provide a useful guide for capacity planning. Even if the CAT calls for tracking a number of disk input-output operations per second, from which disk-access latency may be estimated, the information may be in an inconvenient form from the user's perspective. It would be preferable for the CAT to deal with disk-access latency directly, rather than indirectly through a parameter of little direct interest to the user.

The present invention provides a CAT that allows the user to create new modules for a modular CPT model. The modules, in this case, are models of closed systems (i.e., systems having capacity limits). The CAT allows a user to create a closed-system module (CSM) by specifying a dimension (e.g., processing amount, memory amount, disk-storage amount, or disk input-output bandwidth), along with associated parameters (properties and metrics), e.g., for capacity, demand, and/or usage associated with the respective dimension). The user has the flexibility in the selection of dimensions and parameters to match the CPT system and contextual factors such as service-level agreements.

A model for a CPT system includes models of its resource-container components. Thus, a model of a data center may include a model of a physical server. The model of the physical server can include several CSMs, e.g., for processing in cycles-per-second, memory in gigabytes, disk-storage in terabytes, and disk-storage access in input-output operations per second. If electricity is rationed, the CAT permits the user to define a CSM for power consumption and add it to the server model. If the user prefers access latency in milliseconds to input-output operations per second, the CAT allows the user to create a CSM with access latency as the dimension; the user can then substitute the access-latency CSM for the input-output operations CSM.

Furthermore, the CAT permits a user to select the parameters to monitor for each CSM. In most cases, capacity and demand will be of interest for each CSM. However, there may be more than one relevant capacity parameter, e.g., total physical capacity, useable capacity, and capacity limits imposed as a matter of management policy. The CAT permits any one or more of these parameters to be used. Many systems do not provide demand data per se, so the CAT system permits a usage parameter to be selected along with other parameters that allow demand to be determined based on usage.

The flexibility to arbitrarily design and select CSMs for a CPT model has numerous advantages. The user, typically, an administrator or other expert for the CPT system, can design and create a CPT model that matches the CPT system as well as the user's preferences in terms of dimensions, parameters and units. If circumstances change, the existing model can be extended, e.g., by adding or replacing CSMs without modifying the CAT itself.

A modular CPT model breaks complex computations into more manageable chucks for faster processing and to solve otherwise intractable problems. Computations that might be infeasible in multiple dimensions can become manageable when dealt with one dimension at a time. Each CSM can be analyzed independently, e.g., to determine time remaining before demand equals capacity for the respective dimension. The results can then be combined to yield a capacity analysis for the CPT system or component of interest. For example, the shortest time remaining among the CSM of a CPT system can be the time remaining before the CPT system will fail to meet the demand for at least one resource.

Because of the CAT's versatility, the same tool can be used for different CPT systems. Instead of using different CATs for different aspects of a data center (e.g., different tools for managing blades, different types of clusters, licensing, etc.), a single general-purpose CAT can provide models for all aspects of a data center. Furthermore, the same tool can be applied to other aspects of an enterprise, e.g., capacity planning for airlines, mass transit, shipping routes, parking lots, and so on. For example, dimensions used to characterize a parking lot can include area, number of spots, incoming vehicle rate, average vehicle size, and outgoing vehicle size. Different default dimensions and parameters can be provided for different applications, while the operation of the CAT itself remains consistent across CPT systems.

A capacity-analysis system 100, shown in FIG. 1, includes a capacity-planning-target (CPT) system 102 and its resource-container components 104. Note that a component of a CPT system can itself be considered a CPT system. CPT system 102 can be, for example, a data center, with clusters, host servers, and virtual machines as components. However, very different CPT systems are provided for, e.g., an airline with routes and planes as components.

Capacity-analysis system 100 is designed to provide estimates 106 to be employed in capacity planning for CPT system 102, as shown in FIG. 1. For example, remaining capacities, time remaining before capacity is consumed, and resource usage efficiency can be estimated. Estimates 106 can be provided using a CPT model 108, which includes a container model 109, algorithms 112, functions of time F(t) 114, and correlation models 116. Container model 109 includes CSMs 110 which serve as building blocks for CPT model 108.

CSMs 110 are models of aspects of CPT system 102. Each CSM 110 has an associated dimension (e.g., memory, processing, disk input-output bandwidth) and an associated capacity parameter. In CPT model 108, each CSM 110 is associated with a single dimension to provide the greatest simplification of computations. An alternative embodiment includes a CSM with more than one dimension. Once estimates have been made for the CSMs, the estimates can be combined to provide a multi-dimensional characterization of CPT system 102 and/or components 104 thereof.

CPT model 108 can take the form of an eXtensible Markup Language (XML) document. Modification of CPT model 108 can then be implemented by editing the XML document using a capacity-analysis tool (CAT) 120. CAT 120 provides a model framework 122 that includes a closed-system template 124. Closed-system template 124 defines a capacity-dimension role and associated parameter roles. A CSM can be defined at least in part by assigning a dimension (e.g., processing amount, memory amount) to the dimension role and parameters (e.g., processing capacity, processing demand, processing usage) to the parameter roles. Model framework 122 further includes generalized algorithms 126, the arguments of which are parameter roles. Algorithms 112 of CPT model 108 are created by assigning parameters to the parameter roles. Each parameter is to be evaluated repeatedly so that a time-series 130 of datapoints is generated for each parameter. The various time series 130 can be stored in a database 132, from which they are accessed by CPT model 108.

A user 134, e.g., a CPT system expert user, assigns dimensions and parameters to their respective roles to create CSMs 110 and CPT model 108. CAT 120 can guide user 134 by stepping through CPT components 104 (by component or class of components) of CPT system 102. To this end, CAT 120 has access to CPT configuration data 136, which lists components of CPT system 102 and characterizes their relationships (e.g., host vs. guest); such configuration data is typically available for managing a large system. CAT 120 can provide default selections for dimensions and parameters as well as lists of possible dimensions and parameters to guide user 134. However, a user can define new dimensions and new parameters as needed for a particular CPT system.

Once it has been created, CPT model 108 can be trained using a machine-learning engine 140. Machine-learning engine 140 determines functions F(t) 114 of CPT model 108 that fit time series 130 provided from database 132. In the process, machine-learning engine 140 finds periodic patterns and trends. Furthermore, machine-learning engine 140 includes a correlation engine 142 to find inter-parameter (metric-to-metric) correlations among parameters used to fill out correlation models 116 of CPT model 108. Correlation models 116 can include a correlation table for a single object of metrics. Correlation engine 142 permits modeling of any container to find its capacity automatically and understand the relationship of metrics to each other automatically. This in turn, allows a what-if change to impact all metrics that are collected. For example, access latency may increase as the rate of disk input-output operations increases. Knowing the correlation can permit one unknown to be estimated based on a known or calculated function or value of another parameter. The correlation functions may be linear or non-linear, and uni-variate or multi-variate.

Machine-learning engine 140 can use these correlations to create functions for parameters for which there was no time-series counterpart (either because such data is not provided by the CPT system or because such data is not specified in a what-if scenario 144). For example, machine-learning engine 140 can generate demand data and functions of time based on data associated with usage and other parameters. Once training is complete, the resulting functions 114, correlation models 116 can be used to estimate future values, such as the time remaining before demand or usage reaches capacity.

FIG. 1 includes a graphic representation of closed-system template 124. A graph of a capacity dimension by time includes a constant-capacity line 150 and an increasing demand line 152 which have respective values C and D at a present time T1. These values are used in various algorithms 126 for making capacity-planning estimates. Thus, the remaining capacity at time T1 is C-D and the efficiency of resource usage is D/C. Demand line 152 intersects capacity line 150 at a future time T2. Therefore, the remaining time before demand reaches capacity is T2-T1. In general, one would like capacity to remain above demand by some moderate-sized margin.

"DIMENSION VALUE" in FIG. 1 is a value for a dimension to be assigned to a dimension role; once a dimension is assigned to the dimension role, parameters can be assigned to respective parameter roles. Each assigned parameter is associated with a time series 130 in database 132. For example, user 134 may assign processing capacity to the capacity dimension role for one CSM 110 and memory capacity to the capacity dimension role for another CSM 110. User 134 may select the most convenient (to the user) units for the dimension, e.g., cycles per second (CPS), millions of instructions per second (MIPS), or ticks for a processing dimension.

"CAPACITY" and "DEMAND" in FIG. 1 represent parameter roles to which user 134 can assign parameters for each given CSM. For example, processing capacity can be assigned to the capacity parameter role and processing demand can be assigned to the demand parameter role for a closed-system corresponding to processing capacity of a CPT system component. Each assigned parameter can be identified in terms of the corresponding time series 130 in database 132.

For a given one-dimensional CSM, capacity-analysis calculations can be fairly straightforward where demand is known. However, for many CPT systems and components, demand data is not directly available and so must be derived from usage, for which data is generally available. Thus, FIG. 1 shows CPT system 102 providing usage data 146 to database 132. For many CPT systems, usage tracks demand most of the time. However, usage cannot exceed capacity, and thus cannot match demand when demand exceeds capacity. In such cases, usage data occurring before capacity was reached may be extrapolated to estimate demand while usage is limited to capacity.

Figure 2:
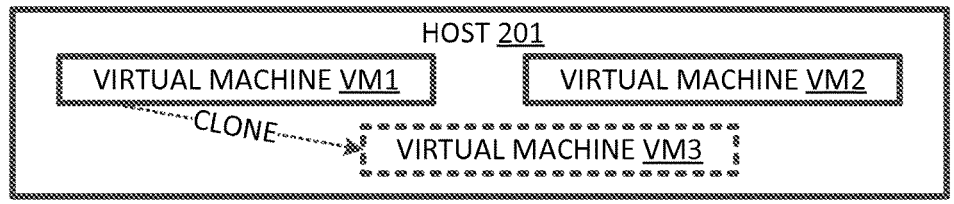
FIG. 2 is a schematic diagram of a virtual-machine host and a model thereof, both of the capacity analysis system of FIG. 1.
Figure 2:
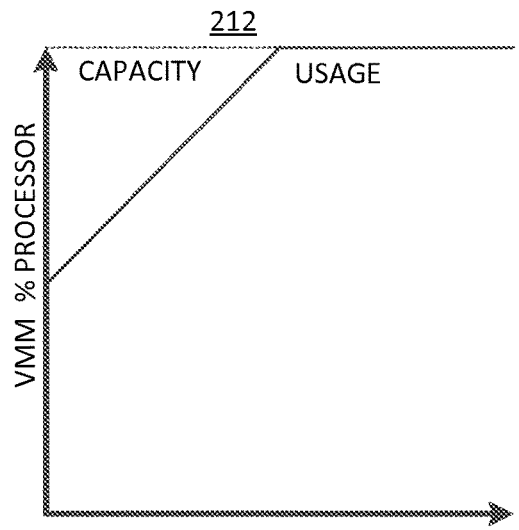
Figure 2:
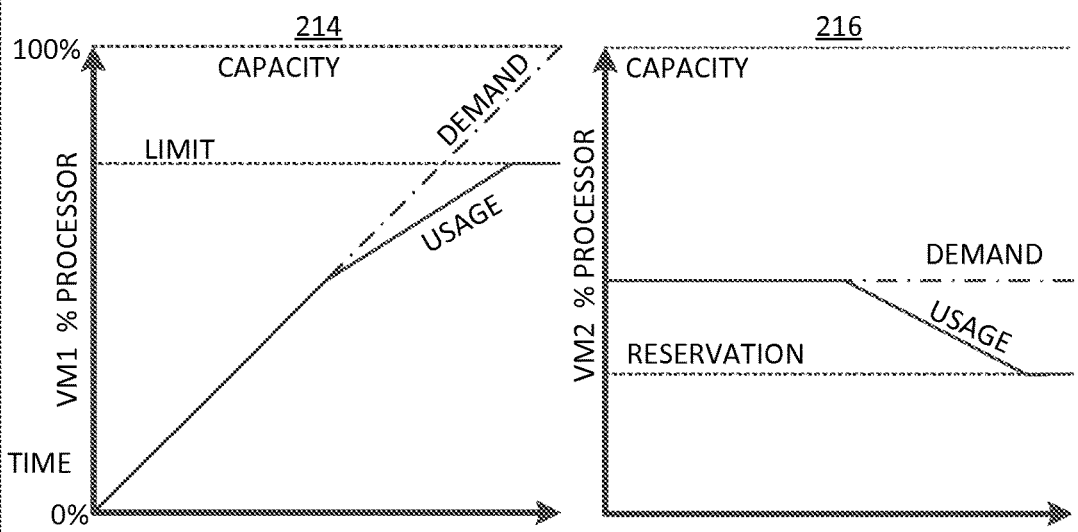

The relationship between usage and demand can be complex in hierarchical CPT systems. For example, as shown in FIG. 2, physical server host 201 (of CPT system 102) hosts virtual machines VM1 and VM2. If, for example, each of virtual machines VM1 and VM2 has a demand for 75% of the processing capacity of host 201, total demand will exceed capacity even though each virtual machine has a demand below capacity.

A CPT model 210 for host 201 can include dozens of CSMs including: a) a processing CSM 212 for host 201; b) a processing CSM 214 for virtual machine VM1; and a processing CSM 216 for virtual machine VM2. (In addition, host 201 and virtual machines VM1 and VM2 can be represented by additional CSMs associated with other dimensions, such as memory, disk storage, etc.) As shown for CSM 214, virtual machine VM1 has a constantly increasing demand for processing resources. As shown for CSM 216, virtual machine VM2 has a constant demand for processing resources. As shown, as long as the total demand is less than capacity, usage matches demand. However, once it reaches capacity, usage plateaus and falls behind demand.

Once the total demand exceeds capacity, the virtual machines are said to be in "contention" so that the demands of at least one of the virtual machines will not be met. One possible approach to contention is to divide available capacity evenly between virtual machines. However, such an approach may not be optimal where one virtual machine is running a higher priority workload than the other. Accordingly, more sophisticated approaches are provided for handling contention situations. Accordingly, closed-system template 124 (FIG. 1) provides for parameter roles designed to handle contention and other issues that can arise in containment hierarchies.

Figure 3:
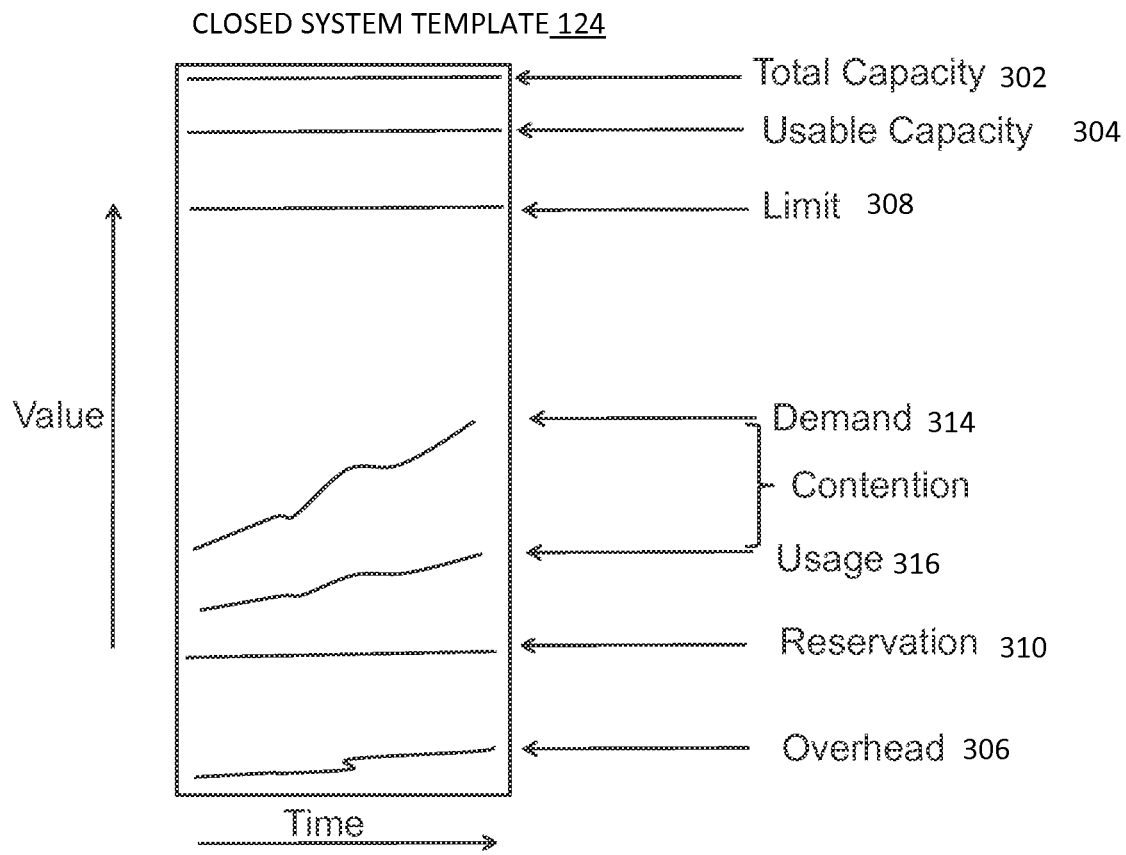
FIG. 3 is a graph representing a closed-system template of a capacity-analysis tool (CAT) of the capacity-analysis system of FIG. 1.

Closed-system template 124 is shown in FIG. 3 along with representations of parameter roles to which parameters can be assigned by user 134. "Total capacity" 302 is a parameter role intended to correspond with parameters representing the full or nominal capacity of a system. For example, if 128 Gigabytes (Gb) of memory is installed in a host, then 128 Gb can be the total capacity for the host. Assuming each virtual machine running on the host potentially has access to the entire memory, then 128 Gb can be the total capacity for each virtual machine running on the host even though a virtual machine may have to share that capacity with one or more other virtual machines.

Less than all of the total capacity of a resource may be available to a component. For example, hypervisor and other system files and processes may limit processing, memory, and storage capacity available to virtual machines. In addition, the efficiency with which a resource can be used may decrease as usage approaches capacity, e.g., due to packing inefficiencies such as disk fragmentation. Accordingly, a "usable capacity" parameter role 304 is provided. Whereas, a hardware specification is typically used as a total-capacity parameter, usable capacity can be empirically determined, e.g., by a level at which usage peaks are truncated. Similarly, an "overhead" parameter role 306 provides for assignment of a parameter corresponding to the system files and processes of a component.

Especially in scenarios in which child components (e.g., virtual machines) contend for the resources of a parent component (e.g., a host server), it may be undesirable to allow one of the child components to consume all of a particular resource. For example, if one virtual machine consumes all available capacity, a co-resident virtual machine may be starved for resources and not get any work done. Accordingly, a policy-based upper "limit" parameter role 308 provides for setting a maximum amount of a resource that can be allocated to a particular child or other component. Correspondingly, a policy-based lower limit or "reservation" parameter role 310 allows a user to specify a minimum level of resources to be guaranteed to a component, e.g., to ensure the component has the resources it needs to function at least at a minimal level or to meet the terms of a service-level agreement.

Other embodiments may provide for other parameter roles, and may omit one, some, or all of the parameter roles listed in FIG. 3. Moreover, a user may create new parameter roles by leveraging extensibility features. The parameter roles assigned can vary across CSMs and components. For example, an entitlement parameter may be assigned to a processing CSM but not to a memory CSM for the same or a different component.

A user assigns a parameter to a parameter role by associating a respective time series 130 (FIG. 1) in database 132 to an identity of the parameter role. The time series may be provided directly from CPT system 102, e.g., for a usage parameter. In other cases, the time series may result from repeating a constant value specified for the hardware, e.g., an amount of installed memory or a speed rating for a processor. Other time series may be generated by a machine-learning engine, e.g., usable capacity parameter values may be generated based on usage data. Alternatively, a machine-learning engine can generate a function of time F(t) directly instead of first generating a time series.

The parameter assigned to a parameter role assumes a respective role in CPT model 108 and machine-learning engine 140. For example, parameters assigned to capacity and demand roles will be used in computing the amount of capacity remaining. In some cases, machine-learning engine 140 may issue an alert when it appears that the parameter's time series does not correspond to the role to which the parameter was assigned.

For systems in which demand data is not provided directly, demand can be determined from usage data 146. To this end, knowledge of other parameters that can affect the relationship between usage and demand can provide for more accurate estimates. For example, time-series values of a contention parameter can be used to improve an estimate of demand based on usage.

There are many other relationships between parameter roles that can permit values of one parameter to be calculated based on values of other parameters, e.g., in what-if scenarios. For example, the reservation level for one virtual machine can limit the usable capacity for another virtual machine. Machine-learning engine 140 makes use of the relationships among parameter roles to refine CPT model 108, while CPT model 108 can use these relationships to provide better capacity-analysis estimates. For example, for host 201 of FIG. 2, assigning a reservation parameter to virtual machine VM1 can affect the usable capacity available to its sibling component, VM2.

As explained above, CPT model 108 (FIG. 1) is created as user 134 assigns dimensions and parameters to their respective roles. Once model 108 is created, machine-learning engine 140 operates to train model 108. Training results in the generation of functions of time F(t) 114 based on time series 130. Even when model 108 is trained, machine-learning engine 140 can continue to operate as model 108 may need to be adjusted as CPT system 102 is reconfigured and new CSMs, dimensions, and parameters are assigned to model 108.

Machine-learning engine 140 fits functions of time F(t) 114 to time series 130; determines correlations among functions; and derives some functions series from other functions. For example, machine-learning engine 140 can fit a function to usage data so that usage at a future time can be estimated. A time function for usable capacity can be determined from usage function. A demand function can be derived from a usage function with the help of other time functions for parameters, e.g., contention, that cause usage to deviate from demand in known ways.

Model 108 uses functions of time 114 to extrapolate into the future. For example, usage, expressed as a function of time, can be extrapolated to estimate a time at which usage will match usable capacity. The same extrapolation can indicate when demand will match capacity, once demand as a function of time has been determined.

What-if scenarios 144 can be evaluated using the functions of time. For example, one might want to know when usage will match capacity for host 201 if virtual machine VM1 is cloned to yield a third virtual machine VM3, as indicated in FIG. 2. In that case, demand will increase at double the rate it climbed before the cloning. Also, if a reservation is applied to VM1, a similar reservation could be applied to the clone. In that case, a sum of the reservations would affect the usable capacity for virtual machine VM2.

In a what-if scenario, it is often useful to determine functions of time for CSMs of a parent component, e.g., a host, from CSMs of child components, e.g., virtual machines. In general, functions of time for sibling components can be combined to yield functions of time for their common parent component. However, the nature of the combination depends on the parameter involved. For example, the demand functions of time for siblings can be summed to yield a demand function of time for the parent. Usage functions of time can be summed subject to capacity limitations.

Estimates relating to single CSMs can be made and then combined to yield multi-dimensional estimates. For example, consider a server that is treated as having a processing CSM, a memory CSM, and a disk-storage input-output bandwidth CSM. One can estimate the time remaining before usage matches capacity for each dimension: processing, memory, and disk-storage input-output. Whichever estimate is for the shortest time, is the time remaining for the server.

Almost inevitably and typically due to capacity planning, the configuration of CPT system 102 (FIG. 1) will change. For example, capacity may be increased by adding a new host server. User 134 can then update model 108, which may then be retrained by machine-learning engine 140. Even without a configuration change, model 108 may have to be modified and retrained. For example, assume that, in the past, the electric utility that supplied power for CPT system 102 imposed rationing on CPT system 102. It might make sense, in that case, to add CSMs with power consumption as the assigned dimension to model 108.

Furthermore, model 108 may be modified due to the addition of a new parameter to an existing CSM. It is possible that the importance of an overlooked parameter might be discovered. For example, the variance in usage might be a dimension that impacts the decision of when to increase capacity as a high variance may result in many short impairments of performance. Again, variance can be added as a parameter to the usage CSM. This change might call for retraining by machine-learning engine 140. It is an advantage of capacity analysis tool 120 and its use of one-dimensional CSMs that new dimensions are easily accommodated as they come into existence or emerge as important. Furthermore, the accommodation can be implemented by the user as opposed to by the CAT vendor.

Container model 109 (FIG. 1) characterizes the relationships between components specified in CPT configuration 136. As explained below with reference to FIGS. 4 and 5, this makes it possible to do what-if modeling of multiple simulated changes to a system and see the impact of capacity and demand changes on other components, e.g., parents, children, and siblings.

Figure 4:
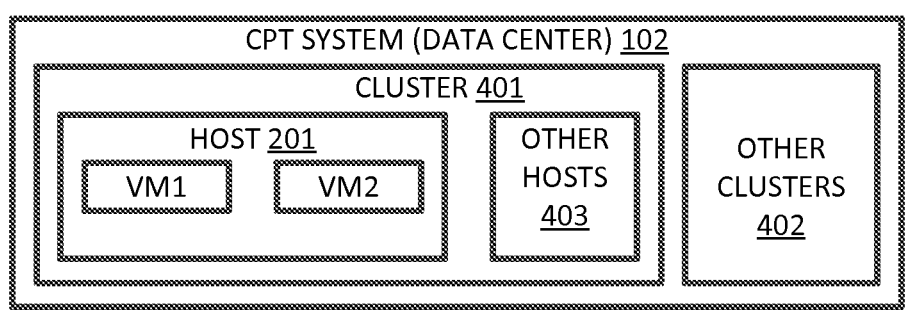
FIG. 4 is a nested hierarchical diagram of a CPT system of FIG. 1.

CPT system 102, which can be a data center, is represented in FIG. 4 as a nested hierarchy. The data center is arranged in clusters, including a cluster 401 and other clusters 402. Cluster 401 includes host 201 and other hosts 202. Host 201 hosts virtual machines VM1 and VM2. Other hosts 403 respectively host virtual machines. Other clusters 402 can include additional hosts, each hosting one or more virtual machines. The data center, the clusters, the hosts, and the virtual machines are "resource containers" in that they include or have access to processing resources, memory resources, communications resources, etc.

Figure 5:
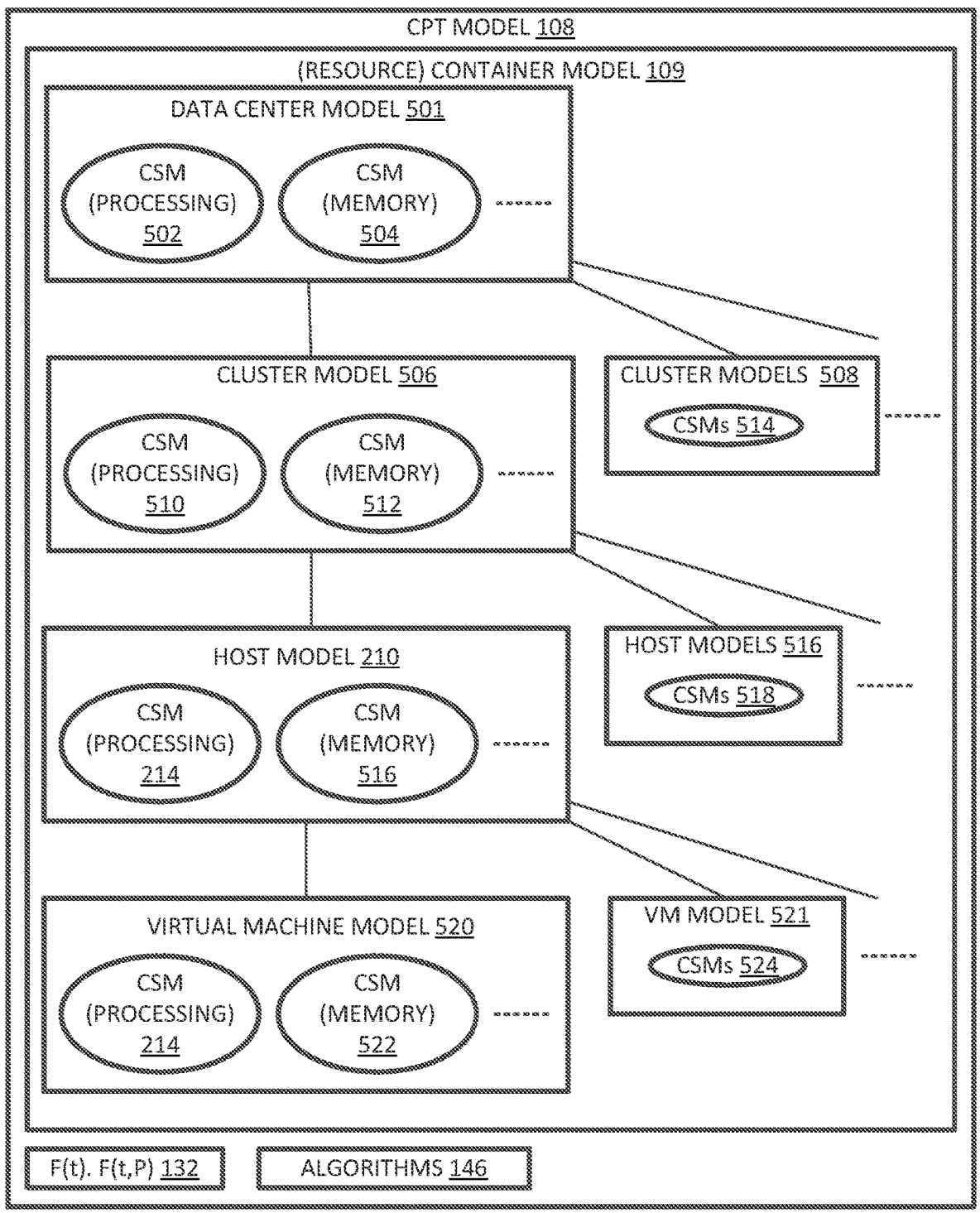
FIG. 5 is a schematic diagram of a CPT model of the CPT system of FIG. 4.

CPT model 108 for CPT system 102 includes a model for each resource-container component 104 of CPT system 102. Data center model 501, shown in FIG. 5, is a model of CPT system 102, i.e., the data center as a whole. Data center model 501 is constituted by CSMs (CSMs) including a processing CSM 502, a memory CSM 504, and other CSMs, e.g., for disk storage, disk storage input-output bandwidth, network bandwidth, temperature, power consumption, etc. Cluster model 506 is a model of cluster 401 (FIG. 4), and is constituted by processing CSM 510, memory CSM 512, and other CSMs. Likewise, cluster models 508 are models of other clusters 402 contained by CPT system 102; each of cluster models 508 can include respective CSMs 514 for multiple dimensions.

Host model 210 is a model for host 201, which is constituted by processing CSM 214 and memory CSM 516, as shown in FIG. 5. Host models 516 are models of other hosts 403 and include CSMs 518. In addition there are models for hosts of clusters 402. Virtual-machine model 520 is a model of virtual machine VM1 and is constituted by processing CSM 214, a memory CSM 522, and CSMs for other dimensions. In addition, there are virtual-machine models 521 with respective sets of CSMs 524. As explained above, CPT model 108 includes algorithms 112, and, once trained, can include functions 114.

Container model 109 not only lists containers, but specifies containment relations between containers. For example, line 530 indicates that CSM 214 is a model of a container that is, itself, contained by a container represented by host model 210. In this sense, host model 210 is a parent of virtual machine model 520, while virtual machines 521 are siblings of virtual machine model 520.

Host model 210 thus provides a multi-dimensional example. Host 201 hosts virtual machines VM1 and VM2, as shown in FIG. 2. One may which to determine the time remaining under a what-if scenario in which one of the virtual machines is cloned, and in which the clone (VM3) runs on the same host. Usage functions can be determined for each dimension of each virtual machine. For each dimension, the usage functions of time can be combined to give a host usage function for each dimension; usage functions can be combined by summing them subject to capacity and contention constraints. Alternatively, usage functions can be converted to demand functions which can be summed without regard to capacity and contention constraints. Time remaining can then be estimated for each host dimension. The shortest time remaining is the time remaining for the host under the what-if scenario.

Note that the same capacity dimension, i.e., processing or memory, is represented at each level of the containment hierarchy. A parameter function for a dimension, e.g., processing amount, can be combined (e.g., summed) across siblings to yield a parameter function for the dimension for the parent. Thus, for example, combining processing usage functions of time for sibling CSMs 214 and 216 (FIG. 2) yields a processing usage function of time for parent (host) CSM 212. Likewise, combining processing usage across host models 210 and 516 can yield a processing function of time for parent cluster model 506. Combining processing functions of time for clusters models 506 and 508 can yield a processing function of time for data center model 501.

Because the relationships among resource-container components 104 are specified, the impact of an addition, deletion or modification of one container on its children, siblings, parent, and other ancestors can be determined. In fact, the impacts on the system as a whole of even complex sets of changes can be determined. This enables what-if modeling of multiple simulated changes to a system so that the impact of capacity and demand changes on parents, children, and siblings can be determined.

Figure 6:
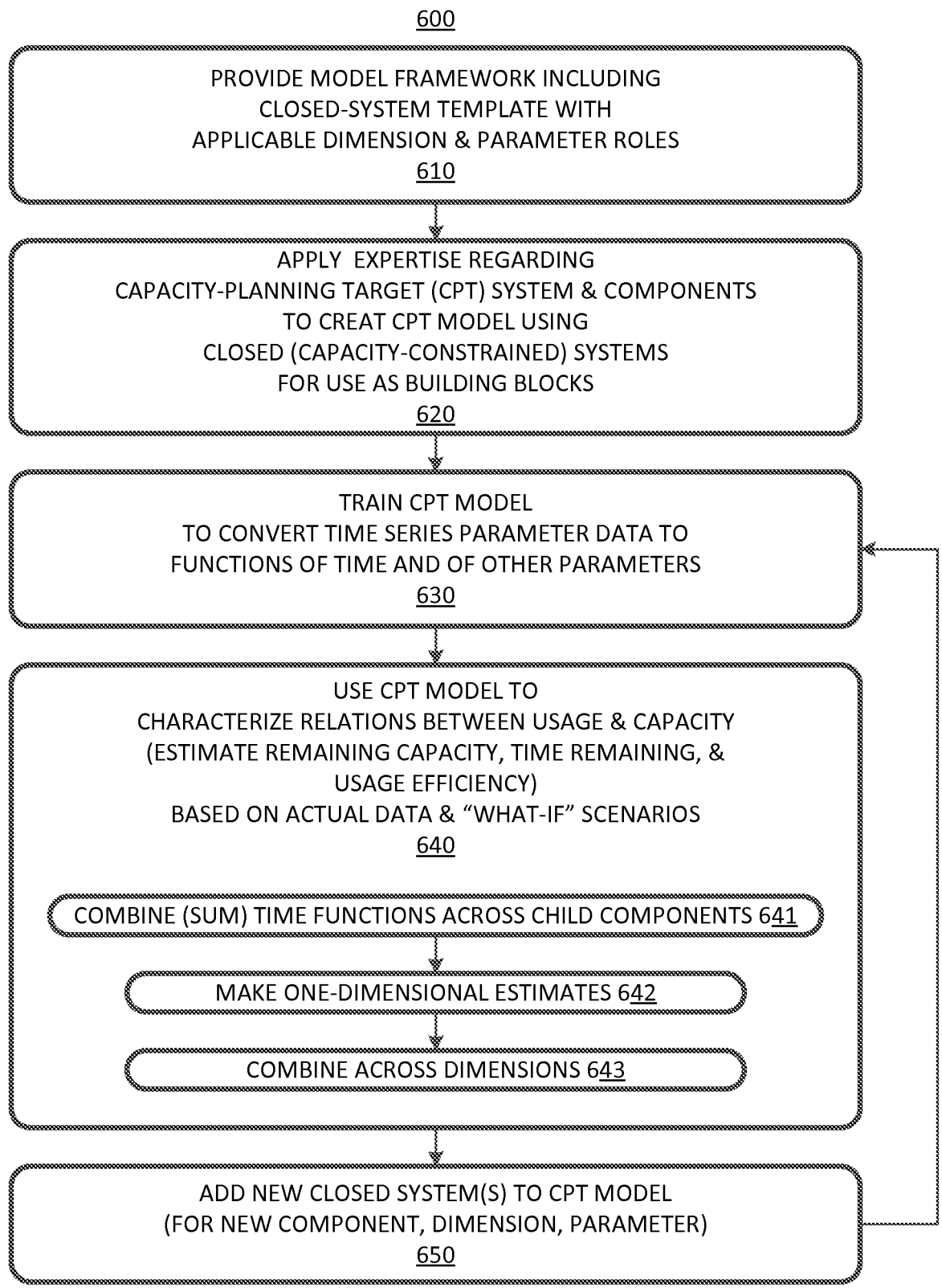
FIG. 6 is a flow chart of a capacity-analysis process implementable in the capacity-analysis system of FIG. 1 and in other systems.

A capacity-analysis process 600, flow-charted in FIG. 6, can be implemented in capacity-analysis system 100 and other systems. At 610, a model framework is provided that includes at least one closed-system template with a dimension role and plural parameter roles. At 620, a user applies expertise regarding a capacity-planning-target system to create a CPT model for which CSMs are the building blocks. The CPT model specifies hierarchical relationships among resource-container models; the CSMs belong to respective resource-container models. Each CSM specifies a dimension assigned to the dimension role and parameters assigned to at least some of the parameter roles. At 630, the CPT model is trained using a machine-learning engine so that time series are fit to functions of time and, in some cases, functions of other parameters.

At 640, capacity-analysis estimates are made using the CPT model. In some scenarios, the estimation procedure can be divided as follows. At 641, in a hierarchical system, functions for child components can be combined inter-component and intra-dimension to yield parent functions for each dimension. For example, demand functions can be summed across virtual machines sharing the same host to yield a demand function of time for the host. Likewise, time functions for hosts can be combined to determine time functions for clusters, and cluster functions of time can be combined to yield time functions for the entire data center. If there is no need to determine parent functions based on child functions, action 641 can be omitted.

At 642, single-dimension estimates can be made based on parent or other component functions for each dimension. For example, single-dimension time remaining estimates for processing, memory, storage, storage input-output, etc. can be made for a virtual-machine host. At 643, single-dimension estimates are combined across dimensions to yield multi-dimensional estimates. For example, the shortest time remaining among single-dimension time-remaining estimates is the multi-dimensional time remaining estimate for the host.

In response to a configuration change or the addition of a new dimension or parameter, new CSMs can be added to the CPT model at 650. This can involve identifying a dimension not already assigned to any CSM module in the CPT model. In addition, the adding can include assigning the identified dimension to a new CSM and adding the new CSM to the CPT model. At that point, process 600 returns to 630, (re)training of the CPT model.

Figure 7:
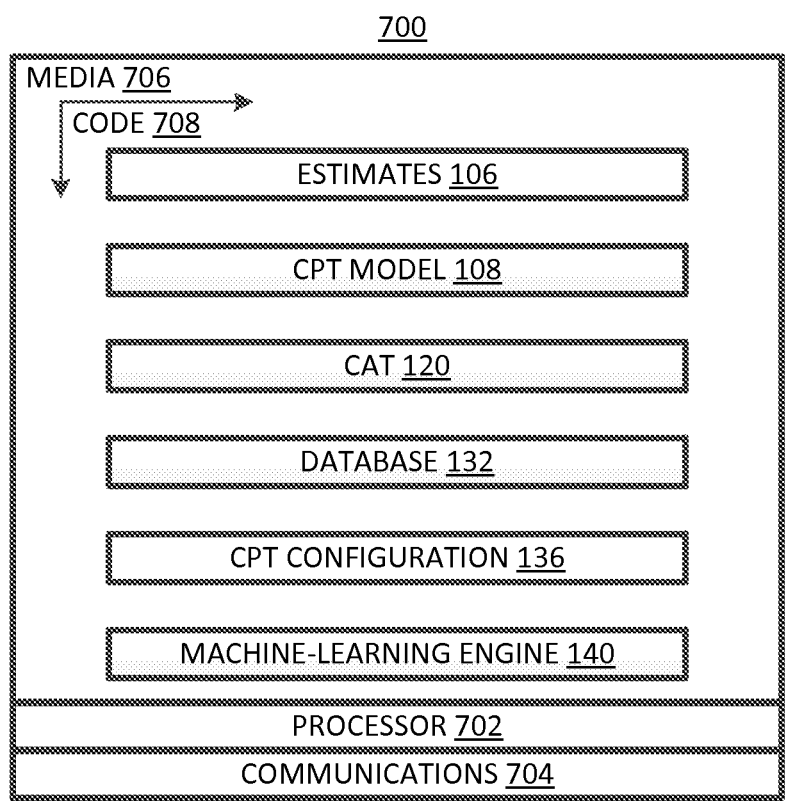
FIG. 7 is a schematic view of a programmed hardware computer system including elements of the capacity-analysis system of FIG. 1.

Process 600 can be implemented on a computer 700, shown in FIG. 7. Computer 700 includes a processor 702, communications (including input-output) devices 704, and media 506. Media 706 is encoded with code 708 representing: estimates 106, CPT model 108, CAT 120, database 132, CPT configuration data 136, and machine-learning engine 140. Code 508 represents software that is used to program hardware to yield programmed hardware that achieves the described capacity-analysis functionality.

For any component, there can be multiple CSMs corresponding to different dimensions according to which the component can be described. The closed-systems can be limited to independent dimensions. For example, disk access rate and disk access latency are not independent as one can be determined from the other; accordingly, it would be an unnecessary processing burden to include CSM for both in a CPT model.

For any given CSM and associated dimension, there can be two or more parameters that can be assigned. The units can vary; for example, processing capacity can be represented in MIPS, CPS, or ticks. Data time averaged over a short period will look different than data time-averaged over a long period. In general, a long period time series can be derived from a short period time series.

Herein, a "system" is a set of interacting elements. Herein, a "capacity-planning target system" or "CPT system" is a system for which capacity planning is or will be applied. A "process" is a system in which the elements are actions. Herein, a "closed system" is a system that is capacity constrained in that usage may be constrained when usage reaches capacity. Certain elements described herein are in the form of programmed hardware, that is, software executing on hardware such as a computer.

Herein, a "model" is a non-transitory, representation of an entity that, in some respects, simulates the entity. Herein, a "CPT model" is a model of a CPT system. A "model framework" is an entity to which information can be added to constitute a model. Herein, a "closed system" is a system that has a capacity limit, i.e., is capacity-constrained. A "CSM" is a model of a closed system, wherein the CSM can be used as a building block for a CPT model. A "correlation model" includes functions that permit values of one parameter to be estimated using values of another parameter. A "correlation table" is a table with items, in this case parameters, listed both in columns and in rows. The cells at the tow-column intersections are for storing correlation values for the row-column pair.

Herein, a CPT model is used to make capacity-analysis estimates, that is, estimates that are useful in evaluating parameters that are in turn applicable to capacity planning. Typically, the parameters to be estimated concern relationships between capacity, on the one hand, and demand or usage on the other. The parameters to be estimated can include: an amount of capacity that a system has; an amount of time before capacity runs out; an amount of capacity remaining; an amount of capacity to meet current or future demand; and an amount of capacity currently being wasted.

A "usage parameter" is a parameter relating to an amount of a resource used or consumed. A "capacity parameter" is an upper limit on the amount of a resource that can be used or consumed. A "demand parameter" is a parameter relating to an amount of a resource requested or needed to meet some objective. "At least partial function of time" means with a pure function of time (F(t)) or a function of time and at least one other parameter, e.g., F(t,p). For example, a parameter may be a function of both time and one or more other parameters, e.g., identified in a correlation model.

Herein, "machine learning" includes a computer evaluating a training set of data so as to develop a model that permits other, e.g., future, data to be predicted. In the present context, the machine-learning fits time series of datapoints to at least partial functions of time; that is functions determined by time alone or by time in conjunction with one or more other independent variables. Machine learning can recognize patterns, trends and correlations in data that can be used to predict future data based on the patterns, trends, and correlations. Herein, the recognized patterns, trends and correlations are used to refine a model created based on a model framework.

The foregoing embodiments, as well as further variations thereupon and modifications thereto are provided for by the present invention, the scope of which is defined by the following claims.

What is claimed is:

1. A process comprising:
   creating, via a processor, a capacity-planning target (CPT) model of a CPT system, the CPT model comprising a plurality of closed-system models (CSMs), wherein each CSM is assigned a respective dimension and a plurality of parameters for the respective dimension, the plurality of parameters comprising a capacity parameter, the plurality of parameters comprising at least one of a usage parameter or a demand parameter, at least one of the parameters corresponding to a respective time series of datapoints, wherein the CPT model specifies a hierarchical relationship at least between a first respective CSM and a second respective CSM of the plurality of CSMs;
   training, via the processor, the CPT model to convert the respective time-series of datapoints to a respective function of time, the respective function of time thereby becoming part of the trained CPT model;
   making, using the trained CPT model, capacity-analysis estimates based at least in part on the respective function of time, wherein the trained CPT model makes the capacity-analysis estimates based on the hierarchical relationship between the first respective CSM and the second respective CSM; and
   determining, via the processor, a plurality of estimated time remaining values for the plurality of CSMs for an instance in which the demand parameter or the usage parameter meets the capacity parameter based at least in part on the capacity-analysis estimates.

2. The process of claim 1, wherein making the capacity-analysis estimates involves evaluating the respective function of time for a future time.

3. The process of claim 1, wherein making the capacity-analysis estimates involves combining plural functions of time across components and within a dimension to yield a system function of time for the dimension.

4. The process of claim 3, wherein making the capacity-analysis estimates further involves making estimates based at least in part on the system function of time.

5. The process of claim 4, wherein [[the]] making the capacity-analysis estimates further involves combining the estimates based at least in part on the system functions of time to yield the capacity-analysis estimates.

6. The process of claim 1, further comprising:
   training the CPT model with a particular CSM to yield a retrained CPT model; and
   making new capacity-analysis estimates using the retrained CPT model with the particular CSM.

7. The process of claim 1, further comprising:
   generating, using the trained CPT model, a correlation model of the CPT model, wherein the correlation model comprises a plurality of correlations among the plurality of parameters.

8. The process of claim 1, further comprising:
   determining, using the CPT model, a shortest time remaining before the usage parameter or the demand parameter meets the capacity parameter based on the plurality of estimated time remaining values for the plurality of CSMs.

9. A capacity-analysis system comprising:
   a computing device that includes a processor;
   a program, when executed by the processor, causes the computing device to at least:
      create a capacity planning target (CPT) model of a CPT system, the CPT model having a plurality of closed-system models (CSMs) associated therewith a dimension role to which a dimension can be assigned and a plurality of parameter roles to which a plurality of parameters can be assigned, the plurality of parameters including a capacity parameter and a demand parameter;
      train the CPT model by converting time-series data associated with at least one of the plurality of parameters to at least one respective function of time based on a hierarchical relationship among the plurality of CSMs; and
      determine, via the processor, a plurality of estimated time remaining values for the plurality of CSMs for an instance in which the demand parameter meets the capacity parameter based at least in part on a plurality of capacity-analysis estimates made by the CPT model.

10. The capacity-analysis system of claim 9, wherein the program is further configured to generate functions of time for some of the plurality of parameters based on functions of time generated from the time-series data.

11. The capacity-analysis system of claim 10, wherein the CPT model includes a version of an algorithm for making the plurality of capacity-analysis estimates.

12. The capacity-analysis system of claim 11, wherein the program further causes the computing device to create the algorithm based on the plurality of parameters being assigned to the plurality of parameter roles.

13. The capacity analysis system of claim 12, wherein the algorithm provides for computing the plurality of capacity-analysis estimates for what-if scenarios provided to the CPT model.

14. The capacity-analysis system of claim 9, wherein each CSM determines a future time in which the demand parameter exceeds the capacity parameter for the dimension.

15. A system, comprising:
a computing device that includes a processor;
a program that, when executed by the processor, causes the computing device to at least:
create a capacity planning target (CPT) model of a CPT system, the CPT model including a plurality of closed-system models (CSMs), wherein each CSM is assigned a respective dimension and a plurality of parameters for the respective dimension, the plurality of parameters comprising a capacity parameter and at least one of a usage parameter or a demand parameter, at least one of the plurality of parameters corresponding to a respective time series of datapoints, wherein the CPT model specifies a hierarchical relationship at least between a first respective CSM and a second respective CSM of the plurality of CSMs;
train the CPT model to convert the respective time-series of datapoints to a respective function of time, the respective function of time thereby becoming part of the CPT model;
make capacity-analysis estimates, using the trained CPT model, based on the respective function of time, wherein the trained CPT model makes the capacity-analysis estimates based on the hierarchical relationship between the first respective CSM and the second respective CSM; and
determine a plurality of estimated time remaining values for the plurality of CSMs for an instance in which the demand parameter or the usage parameter meets the capacity parameter based least in part on the capacity-analysis estimates.

16. The system of claim 15 wherein making the capacity-analysis estimates includes evaluating the respective function of time for a future time.

17. The system of claim 15 wherein making the capacity-analysis estimates includes combining plural functions of time across components and within a dimension to yield a system function of time for the dimension.

18. The system of claim 17, wherein making the capacity-analysis estimates further involves making estimates based at least in part on the system function of time.

19. The system of claim 18, wherein making the capacity-analysis estimates further includes combining the estimates based on system functions of time to yield the capacity-analysis estimates.

20. The system of claim 15, wherein the CPT model is in a form of an eXtensible Markup Language (XML) document.

* * * * *